(12) United States Patent
Le et al.

(10) Patent No.: US 7,530,096 B2
(45) Date of Patent: May 5, 2009

(54) INTERMEDIATE NODE AWARE IP DATAGRAM GENERATION

(75) Inventors: Franck Le, Irving, TX (US); Zhigang Liu, Coppell, TX (US); Stefano Faccin, Dallas, TX (US); Khiem Le, Coppell, TX (US)

(73) Assignee: Nokia Siemens Networks Oy, Espoo (FI)

( * ) Notice: Subject to any disclaimer, the term of this patent is extended or adjusted under 35 U.S.C. 154(b) by 595 days.

(21) Appl. No.: 10/795,260

(22) Filed: Mar. 9, 2004

(65) Prior Publication Data

US 2005/0102504 A1 May 12, 2005

Related U.S. Application Data

(60) Provisional application No. 60/518,868, filed on Nov. 12, 2003.

(51) Int. Cl.
*G06F 17/30* (2006.01)
(52) U.S. Cl. .................... 726/5; 726/4; 726/3
(58) Field of Classification Search ............ 726/3, 726/2, 4, 5
See application file for complete search history.

(56) References Cited

FOREIGN PATENT DOCUMENTS

EP         1 357 719 A        10/2003

OTHER PUBLICATIONS

Adaptive RS Code for Message Delivery Over Encrypted Military Wireless Networks Grushevsky, Y.L.; Elmasry, G.F.; Argentieri, S.R.; Lussier, R.; Military Communications Conference, 2006. MILCOM 2006 Oct. 23-25, 2006 pp. 1-5.*

Protocol design for scalable and reliable group rekeying Zhang, X.B.; Lam, S.S.; Dong-Young Lee; Yang, Y.R.; Networking, IEEE/ACM Transactions on vol. 11, Issue 6, Dec. 2003 pp. 908-922.*

On vulnerabilities and improvements of fast encryption algorithm for multimedia FEA-M Mihaljevic, M.J.; Consumer Electronics, IEEE Transactions on vol. 49, Issue 4, Nov. 2003 pp. 1199-1207.*

Kasera, et al. "*IP Encapsulating Security Variable Payload*" Internet Engineering Task Force, Oct. 28, 2002, pp. 1-13.

Assaf, et al., "*Interworking Between IP Security and Performance Enhancing Proxies for Mobile Networks*", Architectures and Protocols for Wireless Mobile Internet, IEEE Communications Magazine, XP-001129450, May 2002, pp. 138-144.

Kasera, et al., "*On Securely Enabling Intermediary-Based Services and Performance Enhancements for Wireless Mobile Users*", XP-002316715, Sep. 19, 2003, pp. 61-68.

"*Proceedings of the 9th USENIX Security Symposium*", XP-002316714, Aug. 14-17, 2000, pp. 1-17.

(Continued)

*Primary Examiner*—David Y Jung
(74) *Attorney, Agent, or Firm*—Squire, Sanders & Dempsey, LLP (57) ABSTRACT

According to the invention, information in clear text is added to a data packet transmitted from a sender to a receiver with end-to-end security in an IP network, which information indicate encrypted data fields in payload data of the packet and/or instruct an intermediate node located on a path between the sender and the receiver how to process the packet, wherein the part of the packet in which the information is provided is different from payload data.

18 Claims, 4 Drawing Sheets

OTHER PUBLICATIONS

Zhang, et al., "*A Multi-Layer IPsec Protocol*", HRL Laboratories, LLC.

Bellovin, et al., "*Transport-Friendly ESP*", AT&T Labs Research, www.research.att.com/~smb.

Handley, et al., "*SDP: Session Description Protocol*", Network Working Group, Request for Comments: 2327, Apr. 1998, pp. 1-40.

Kent, et al., "IP Encapsulating Security Payload (ESP)", Network Working Group, Request for Comments: 2406, Nov. 1998, pp. 1-21.

Rosenberg, et al., "*SIP: Session Initiation Protocol*", Network Working Group, Request for Comments: 3261, Jun. 2002, pp. 1-252.

\* cited by examiner

INTERMEDIATE NODE AWARE IP DATAGRAM GENERATION

CROSS-REFERENCE TO RELATED APPLICATIONS

This application claims priority of U.S. Provisional Application Ser. No. 60/518,868, entitled "An Intermediate Node Aware IP Datagram Generation," filed Nov. 12, 2003, the entire contents of which are incorporated herein by reference.

FIELD OF THE INVENTION

In general, the present invention relates to supporting IP (Internet Protocol) services in IP mobile wireless networks, particularly in 3GPP (Third Generation Partnership Project) and 3GPP2 networks. The invention is concerned with a secure provision of services, e.g. confidentiality of IP packets payload and packet filtering through firewalls, and with a performance enhancement for IP services such as payload compression.

In particular, the present invention relates to an intermediate node aware generation of data packets to be transmitted with end-to-end security between a sender and a receiver in an IP network system.

BACKGROUND OF THE INVENTION

The IPsec (IP security) ESP (Encapsulating Security Payload) is currently the IETF (Internet Engineering Task Force) security protocol for the encryption of IP datagrams. IPsec implementation is mandated for every IPv6 (Internet Protocol Version 6) node.

As described by S. Kent, R. Atkinson in "IP Encapsulating Security Payload", Network Working Group, RFC 2406, November 1998, when ESP is used the ESP header must be placed after the IP header, and the whole payload after the ESP header is encrypted. This allows a good level of confidentiality since, except from the IP header, an eavesdropper cannot access any other data such as transport protocol header, payload, etc.

In IP networks, intermediate entities, e.g. firewalls, performance enhancing proxies, etc., are being developed and deployed to add security or increase performances. These network entities typically need to have access to some specific fields located after the IP header in order to perform the functions they are designed for. For example, firewalls need to filter packets based on the TCP/UDP port numbers, and need to read the content of SDP (Session Description Protocol) fields in SIP (Session Initiation Protocol) signaling to open pinholes for SIP communications. For more details regarding SDP and SIP it is referred to M. Handley, V. Jacobson: "Session Description Protocol", Network Working Group, RFC 2327, April 1998, and J. Rosenberg et al.: "Session Initiation Protocol", Network Working Group, RFC 3261, June 2002.

The presence of IPsec ESP and the encryption of the above-mentioned fields prevent these intermediate nodes from accessing the necessary information. Usually, the intermediate node needs to sniff the packet payload in clear text before applying any optimization. Furthermore, firewalls are typically configured to drop packets according to policy rules, or when packets cannot be inspected successfully. The presence of IPsec ESP will therefore result in packets being dropped, or in a loss of performance optimization, with a considerable impact on cellular links.

In "Transport-Friendly ESP", December 1998, Steven M. Bellovin proposes an ESP format that will allow to leave the first part of the payload in clear text, and only the last part of the payload will be encrypted. This proposal may be useful for an intermediate node that needs to obtain the TCP/UDP (Transport Control Protocol/User Datagram Protocol) port numbers. However for other intermediate nodes such as SIP-aware-firewalls that need to have access to the SDP fields to open the appropriate pinholes for the media stream, this solution means that all the data until (including) the SDP will have to stay in clear text. However, this is a condition that may be not acceptable: the sender of the SIP message will most probably want to hide its identity which is carried in the SIP header fields that precede the SDP in the message.

In "A Multi-Layer IPsec Protocol", Y. Zhang, B. Singh, Proc. of the 9th USENIX Security Symposium, Denver, Colo., USA, August, 2000, a protocol is proposed that offers more flexibility than the Transport-Friendly ESP method by allowing to have a sequence of encrypted—clear text—encrypted data, for example. Basically, the protocol divides an IP datagram into several parts (or zones) and applies different forms of protection to different zones. However, the negotiation of the zone is not defined. According to the prototype, the zones were manually configured. However, such manual, i.e. fixed zone definition will not allow this method to solve the above-described problem of accessing necessary information.

In addition to the fact that the above-mentioned approaches do not solve the addressed problem, these two protocols do not allow any other signaling that could be used for intermediate nodes to perform optimizations.

SUMMARY OF THE INVENTION

It is therefore an object of the present invention to provide IP datagrams which allow both end-to-end security and optimization by an intermediate node.

According to an aspect of the present invention, this object is achieved by a method of generating data packets to be transmitted with end-to-end security between a sender and a receiver in an IP network system, the method comprising the step of:

providing information for an intermediate node, which is located on a path between the sender and the receiver, in a part of a packet in clear text, the information supporting the intermediate node in processing the packet, wherein the part of the packet in which the information is provided is different from payload data.

Moreover, the object is achieved by a signal comprising data packets to be transmitted with end-to-end security between a sender and a receiver in an IP network system, wherein at least one packet comprises information for an intermediate node, which is located on a path between the sender and the receiver, in a part of a packet in clear text, the information supporting the intermediate node in processing the at least one packet.

Furthermore, the object is achieved by a sender arranged to generate data packets to be transmitted with end-to-end security between the sender and a receiver in an IP network system, the sender being further arranged to:

provide information for an intermediate node, which is located on a path between the sender and the receiver, in a part of a packet in clear text, the information supporting the intermediate node in processing the packet.

According to another aspect of the invention, the above object is achieved by a method of generating data packets to be transmitted with end-to-end security between a sender and a receiver in an IP network system, the method comprising the step of:

providing information in a part of a packet in clear text, the information indicating encrypted fields in payload data of the packet, wherein the part of the packet in which the information is provided is different from payload data.

Moreover, the object is achieved by a signal comprising data packets to be transmitted with end-to-end security between a sender and a receiver in an IP network system, wherein at least one packet comprises information in a part of a packet in clear text, the information indicating encrypted fields in payload data of the at least one packet.

Furthermore, the object is achieved by a sender arranged to generate data packets to be transmitted with end-to-end security between the sender and a receiver in an IP network system, the sender being further arranged to:

provide information in a part of a packet in clear text, the information indicating encrypted fields in payload data of the packet.

According to a further aspect of the invention, the above object is achieved by an intermediate node located on a path between a sender and a receiver in an IP network system, the intermediate node being arranged to process data packets transmitted between the sender and the receiver with end-to-end security, the intermediate node being further arranged to:

receive a data packet transmitted from the sender to the receiver with end-to-end security;

detect information provided in a part of the received packet in clear text; and process the packet on the basis of the detection result.

Moreover, the object is achieved by a method of processing data packets transmitted between a sender and a receiver with end-to-end security, in an intermediate node located on a path between the sender and the receiver in an IP network system, the method comprising the steps of:

receiving a data packet transmitted from the sender to the receiver with end-to-end security;

detecting information provided in a part of the received packet in clear text; and processing the packet on the basis of the detection result.

According to a still further aspect of the invention, the above object is achieved by a receiver being arranged to receive data packets transmitted between a sender and the receiver with end-to-end security in an IP network system, the receiver being further arranged to:

detect on the basis of information provided in a part of a received packet, which fields of payload data of the packet are in encrypted form; and decrypt the detected encrypted payload fields.

Furthermore, the object is achieved by a method of receiving data packets transmitted between a sender and a receiver with end-to-end security in an IP network system, the method comprising the steps of:

detecting on the basis of information provided in a part of a received packet, which fields of payload data of the packet are in encrypted form; and decrypting the detected encrypted payload fields.

Moreover, the present invention may be implemented as computer program product.

According to one aspect of the invention, in a part of a packet to be transmitted with end-to-end security between a sender and a receiver in an IP network system, information for an intermediate node is provided in clear text, the intermediate node being located on a path between the sender and the receiver. The provided information is to support the intermediate node in processing the packet.

In other words, in a data packet information in clear text is provided such as data units comprising at least one bit, which information supports the intermediate node in processing the packet which is transmitted between the sender and the receiver e.g. in accordance with a specific security association in which the intermediate node is not involved.

The information may comprise data indicating how fields in the payload or the entire packet is to be processed by the intermediate node. In other words, the provided information may be used by the intermediate node to perform optimization on the packet. The part of the packet in which the information is provided may be different from payload data, i.e. the information may be provided in the header of the packet.

Moreover, the information may include data providing an indication on encrypted fields and fields in clear text present in payload data of the packet. In this context, fields of the payload data in clear text may be selected, which fields are to be encrypted, or fields of the payload data in clear text may be selected which should be left in clear text in order to enable their processing by the intermediate node. After this selection, the fields to be encrypted are concatenated, the concatenated fields are encrypted, and an encryption result is split up according to a length of the fields. Then, the encrypted fields are replaced in the payload data in clear text, and the fields of the payload data in encrypted form and/or the fields of the payload data in clear text are indicated in the information on the basis of the payload data including the replaced encrypted fields.

According to another aspect of the invention, in a part of a packet to be transmitted with end-to-end security between a sender and a receiver in an IP network system, information are provided in clear text, the information indicating encrypted fields in payload data of the packet. The part of the packet in which the information is provided may be a header of the packet.

Furthermore, in the information it may be indicated how the packet is to be processed by an intermediate node located on a path between the sender and the receiver.

At the intermediate node, the packet is received, the information which may comprise the information for the intermediate node is detected and the packet is processed on the basis of the detection result.

Moreover, at the receiver, the packet is received, it is detected in the information which fields of the payload data are in encrypted form, and the detected encrypted payload fields are decrypted.

According to an embodiment of the present invention, a method of adding information to IP headers is defined in order to indicate how the payload should be processed. In particular, a mechanism is provided to indicate in the header how fields in the payload or the entire packet should be processed by intermediate nodes, e.g. to provide information to enable Performance Enhancing Proxies (PEPs) to perform packet optimisation.

Moreover, the invention defines a mechanism for selectively encrypting fields in the payload, maintaining in clear text the fields that need to be processed by an intermediate node, and indicating in the header which fields are encrypted and which ones are in clear-text.

As can be seen from the above, the idea of the present invention is not restricted to security. The added bits can be used not only to describe which fields are encrypted and which ones are in clear text, but also to carry useful information (e.g. signaling information) for an intermediate node to perform optimization on the packet: typically it could be used by a server to inform a PEP or other intermediate nodes how to process the packet. This is required in a scenario where a sender wants to use ESP to encrypt the payload of IP packets it generates to achieve end-to-end security, but at the same time wants to allow a certain optimization done by an intermediate node on the path to an end receiver.

Usually, the intermediate node needs to sniff the packet payload in clear text before applying any optimization. The invention meets that requirement and allows both end-to-end security and optimization by an intermediate node.

Thus, according to the invention intermediate nodes are allowed to process packets as required while confidentiality for sensitive information still is provided.

In the following, the invention will be described in more detail by way of preferred embodiments thereof taking into account the accompanying drawings.

DESCRIPTION OF THE PREFERRED EMBODIMENTS

Several ways of implementing the invention are possible, and specific embodiments are described below. However, the invention is not restricted to those specific implementations.

In the following description, a field simply means a sequence of bits in the IP payload. It does not necessarily map to a field as defined in protocols that are carried inside the IP payload (e.g. TCP/UDP header field, SIP header field, or SDP field).

Extension Header According to the First Embodiment

Figure 1:
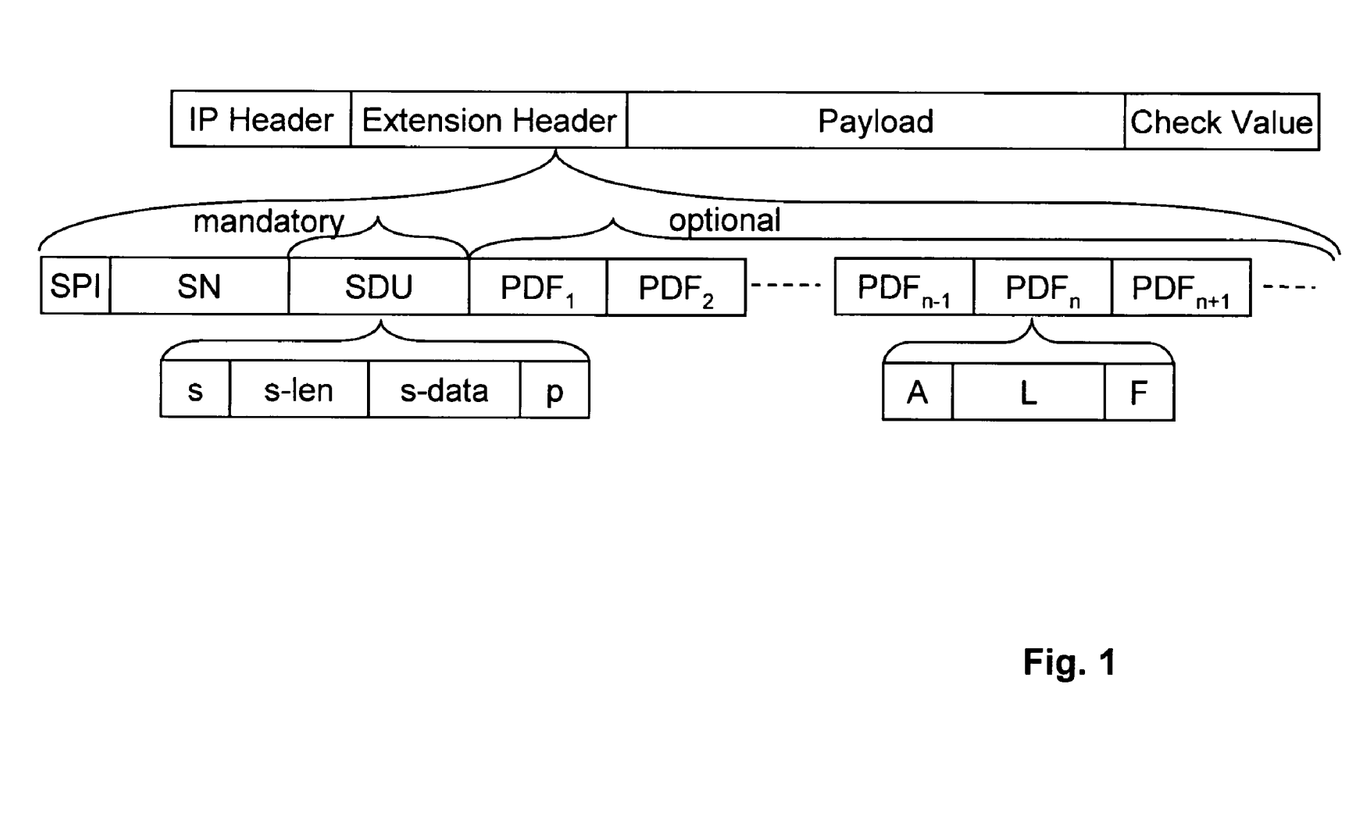
FIG. 1 shows a format of an IP packet according to a first embodiment.

FIG. 1 shows a format of an IP packet. Following an IP header, an extension header according to the invention is defined. After the extension header payload data follow. The payload data may be encrypted or in clear text, as described below. An optional authentication data field 'Check Value' may also be carried in the packet after the payload data.

The preferred implementation of the invention comprises the definition of an IP extension header on the basis of the current IPsec ESP header. As shown in FIG. 1, the extension header includes:
- a Security Parameter Index (SPI) so that a receiving endpoint knows what Security Association (SA) to retrieve to process the packet,
- a Sequence Number (SN) for anti replay attacks, and
- a Signalling Data Unit (SDU).

The SDU is always present, with a minimal length of 2 bits. The format of the SDU is shown in FIG. 1.

The SDU comprises a bit s which may be followed by data fields s-len and s-data, and a bit p. If the s bit is set to 0 (zero), the s-len and s-data fields are not present. Otherwise, the s-len and s-data fields will follow after the s bit. The p bit is always present regardless of the value of the s bit. Thus, the minimal length of a signaling data unit is 2 bits.

The field s-len indicates the length of the s-data field. The s-data field contains actual signaling data, which can be used by an intermediate node (e.g. a PEP) for optimization purpose.

In case the p bit is set to 0 (zero), no Protection Description Fields (PDFs) to be described below are contained in the extension header. Otherwise, one or more PDFs follow the SDU.

The extension header may also comprise a sequence of PDFs. Any number of PDFs can be present, including no PDFs for the scenario where only SDU information is carried as mentioned above. A lack of any PDF indicates that the entire payload after the extension header is in clear text. The format of a PDF is shown in FIG. 1. A PDF comprises fields A, L and F to be described in the following.

The field A comprises one bit indicating whether a field in the payload is encrypted or not. If the A bit of an $n^{th}$ PDF is set to 1, it is indicated that the $n^{th}$ field in the payload is encrypted, and if the A bit of the $n^{th}$ PDF is set to 0, it means that the $n^{th}$ field in the payload is in clear text.

For the fields that are encrypted, the L field specifies the length of the encrypted field. For the field in clear text, the L field is optional assuming the length of the field in clear text can be derived (this is dependent on the protocol in the payload). Otherwise, L is mandatory and specifies the length of that field.

The F field comprises one bit indicating whether a further PDF follows or not. If the F bit of the $n^{th}$ PDF is set to 1, it means that a $(n+1)^{th}$ PDF is present, and if the F bit of the $n^{th}$ PDF is set to 0, it means that the $n^{th}$ PDF is the last one in the PDF sequence. Obviously, the extension header ends here.

It is noted that for efficiency reasons SDU and PDFs (if present) as described above are not byte aligned. However, the IP payload (either encrypted or in clear text) after the extension header is byte aligned. Therefore, padding bits may be needed at the end of the extension header. For parsing and efficiency purpose, the number of padding bits must be in the range of 0 to 7.

Furthermore, the lengths of the s-len and L fields are not specified above. For example, either fixed length or some variable length encoding schemes may be used for those fields.

Extension Header According to the Second Embodiment

In the second embodiment the format of the extension header is the same as in the first embodiment except for the encoding of the Protection Description Fields (PDFs). In the second embodiment, the number of PDFs corresponds to the number of fields in the payload that are encrypted. Any number of PDFs can be present, including no PDFs for the scenario where only SDU information is carried as mentioned above. A lack of any PDFs indicates that the entire payload after the extension header is in clear text. The format of a PDF according to the second embodiment is shown in FIG. 2.

Figure 2:
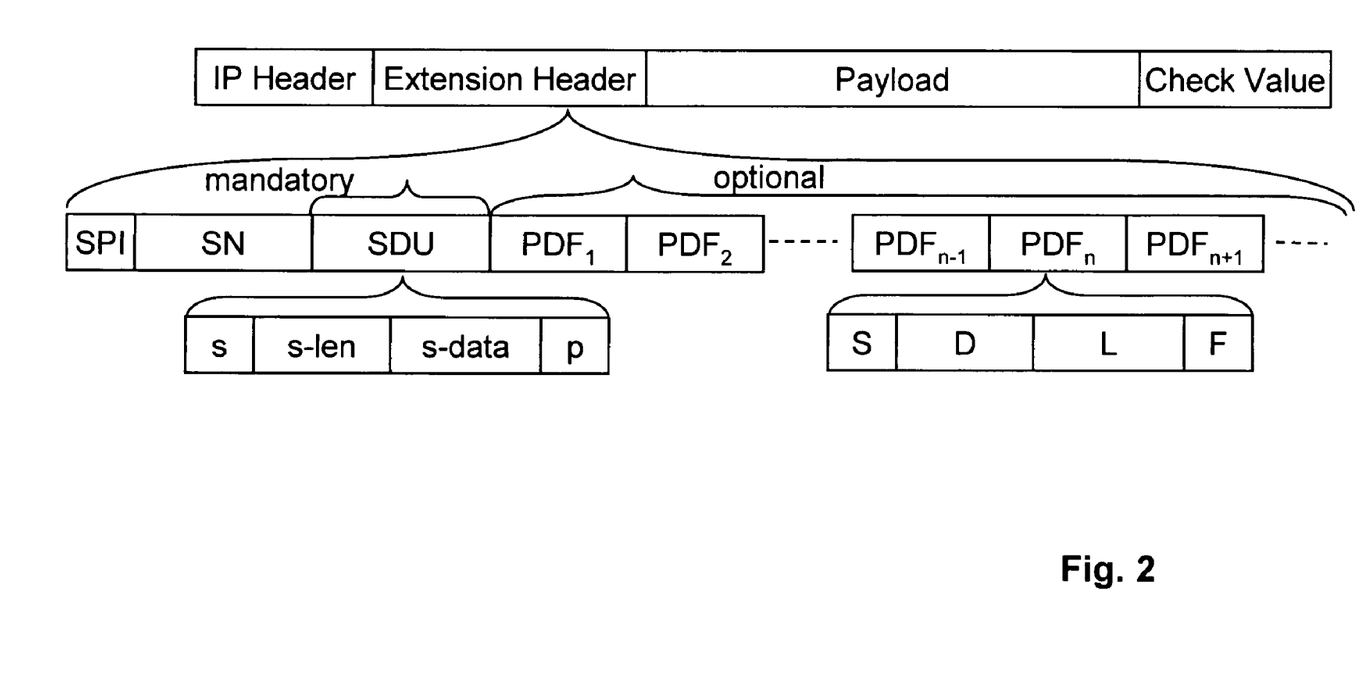
FIG. 2 shows a format of an IP packet according to a second embodiment.

As shown in FIG. 2, the PDF according to the second embodiment includes fields S, D, L and F. The S field comprises one bit indicating whether the D field is present or not.

The D field specifies the number of bits between the $n^{th}$ encrypted field and the $n^{th}-1$ encrypted field. The D field is not present if the $n^{th}$ field is the first field, or if the sender assumes that the receiver is capable of determining the location of the $n^{th}$ field.

The S bit is set to 1 when the D field is present, i.e. when it is assumed that the receiver requires the D field to know exactly the distance in number of bits between the previous encrypted field and the current encrypted field. The S bit is set to 0 when the D field is not present (e.g. when the PDF is for the first field).

The L field specifies the length of the encrypted field. L is mandatory.

The F field comprises one bit indicating whether a further PDF is present or not. If the F bit of the $n^{th}$ description field is set to 1, this indicates that a $(n+1)^{th}$ field is present. If the F bit of the $n^{th}$ description field is set to 0, it means that the $n^{th}$ field is the last one of the PDF sequence. The L field and the F field are always present regardless of the value of the S bit.

As shown in FIGS. 1 and 2, following the extension header are the payload data fields that are either encrypted or in clear text, as indicated by the PDFs. An optional authentication data field—similar to that described in RFC 2406—may also be carried in the packet after the payload data fields. If present, the authentication data field contains an integrity check value over the entire packet except itself. This allows the end receiver and/or the intermediate nodes to detect if a packet has been modified after it was generated by the original sender.

A sender needs to be cautious on the content of the signaling data unit (SDU) and the associated security risks. The same applies to the portions of an IP datagram that are in clear text. Usually, the sender can find a good trade-off between ultimate security and appropriate handling of the IP datagram.

Implementation of the Invention in a Sender, Receiver and Intermediate Node

Figure 3:
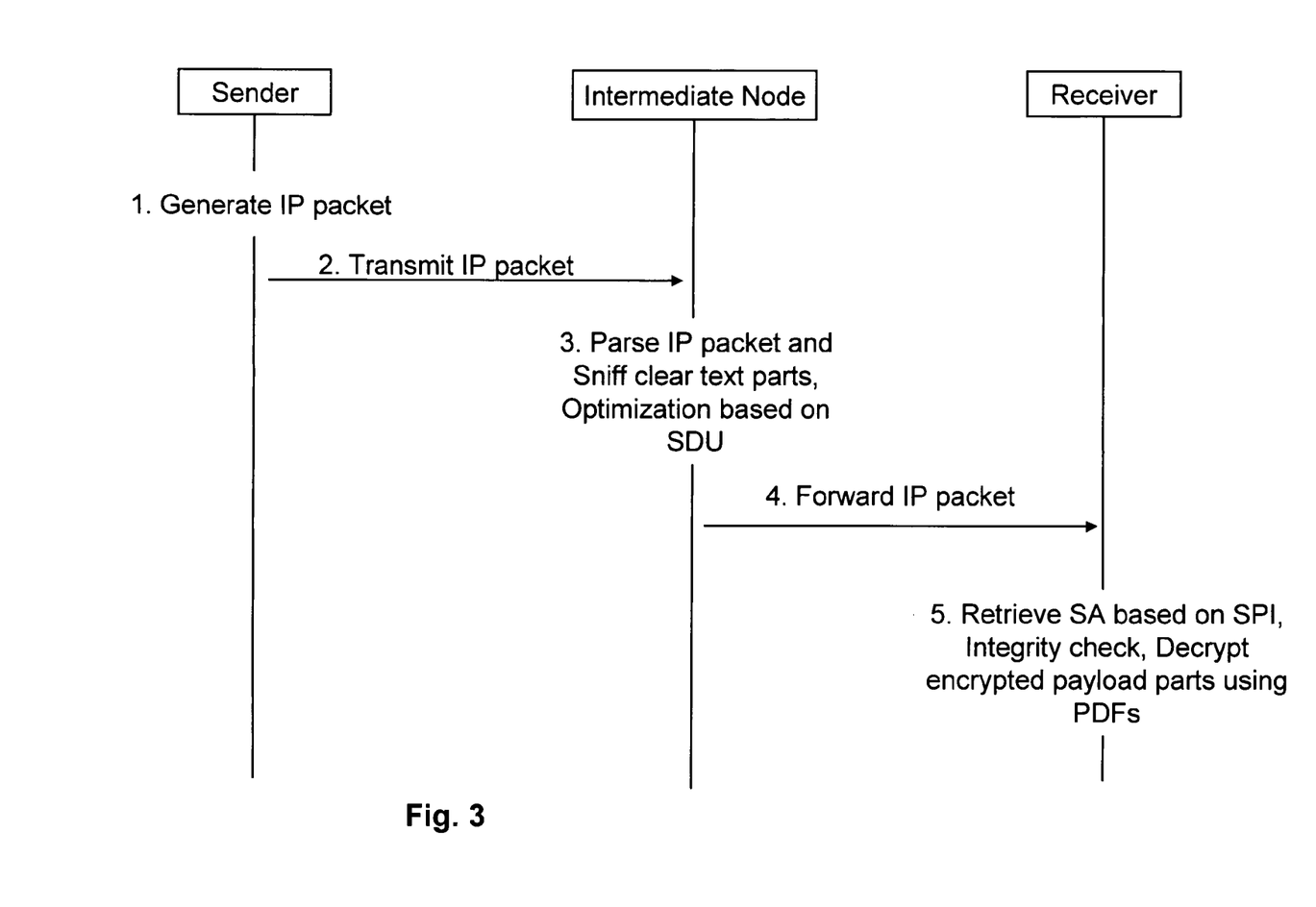
FIG. 3 shows a schematic diagram illustrating an implementation of the invention in a sender, receiver and intermediate node.

FIG. 3 shows a schematic diagram illustrating an implementation of the invention in a sender, receiver and intermediate node located on the path between the sender transmitting IP packets and the receiver which is to receive the transmitted IP packets.

In the sender, in step 1, an IP packet is generated according to the format of the first or second embodiment. In particular, the sender should not encrypt parts of the payload that it expects an intermediate node needs to sniff. For example, this knowledge can be based on pre-defined information for a given service. In the sender it may be decided what fields need to be encrypted based on a specific protocol and application. The encryption procedure is the same as in ESP, except that first the fields to be encrypted are selected, and then they are concatenated before the encryption is performed in the sender. The result is then split up according to the length of the fields, and the resulting encrypted fields are replaced in the original message. Based on this, protection description fields (PDFs) are added to the extension header according to either the first or second embodiment.

In addition, the sender may choose to include signaling in the signaling data unit (SDU), in which case the SDU field has a length longer than 2 bits. The semantics of the signaling data has to be agreed between the sender and the intermediate node, for example based on a specific service or a specific network, e.g. 3GPP, where all nodes will have to follow a given behavior.

Then, in step 2, the sender transmits the IP packet towards the receiver via an intermediate node. When the IP packet arrives at the intermediate node, in step 3, the intermediate node may parse the packet and sniff the payload parts that are in clear text, e.g. TCP/UDP port number or SDP fields as mentioned above, if it is required to do so, by interpreting the PDFs or the p bit of the SDU to know where payload parts in clear text are located. In addition, the intermediate node may perform an appropriate optimization on the packet based on the content of the signaling data unit. The intermediate node cannot perform any decryption since it does not know the end-to-end security association (SA). Also, it should not modify the extension header and data thereafter if the authentication data field is present. Otherwise, an integrity check fails at the receiver.

In step 4 the IP packet is forwarded to the receiver. When the packet reaches the receiver, in step 5 the receiver retrieves the SA based on the SPI and performs the integrity check if the authentication data field (check value) is present. After having detected on the basis of the p bit of the SDU that encrypted payload parts are present, the receiver decrypts the encrypted payload parts using the PDFs as indicators of what fields are encrypted. The decryption procedure is the same as in ESP except that the receiver concatenates the encrypted parts before decryption. Then, the decrypted IP payload, i.e. data after the extension header, will be delivered to the layer above IP.

It has to be noted that, for simplicity, the invention is described with the option of having the payload either encrypted or in clear text, but the invention could be easily extended to allow the different fields to be encrypted with different security keys.

The sender may be a mobile node which is adapted to generate an IP packet in accordance with the format defined in the first or second embodiment. The receiver may be a P-CSCF (Proxy Call Session Control Function) which is adapted to decrypt the encrypted payload parts on the basis of the PDFs carried in the extension header. Furthermore, as mentioned above, the intermediate node may be a firewall or a PEP which is adapted to access some specific fields in the payload in clear text in order to perform its function, and which is further adapted to perform optimization on the basis of the signaling data in the SDU of the extension header.

In the following, an embodiment of an IP packet generation according to the present invention is described by referring to FIG. 4.

Figure 4:
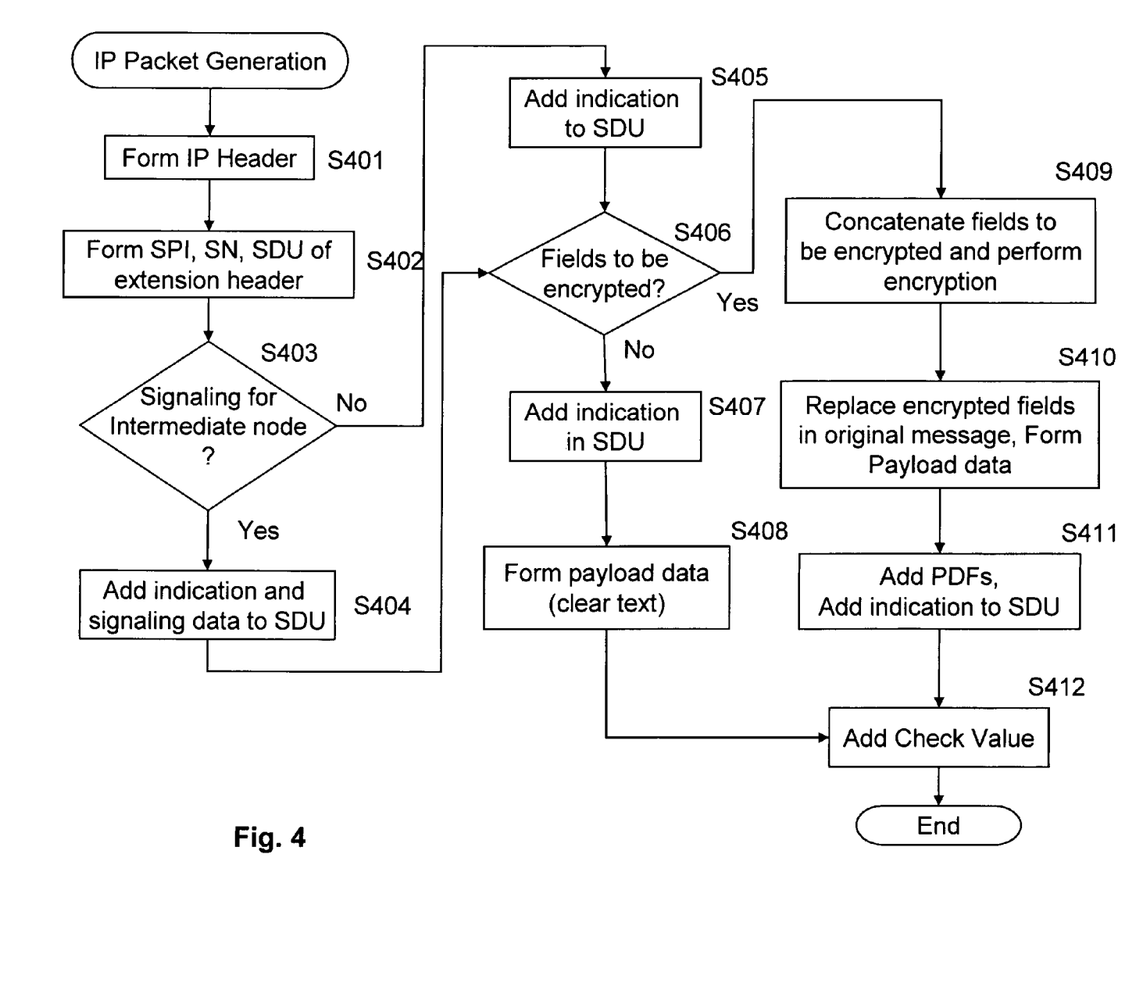
FIG. 4 shows a flow chart illustrating processing steps of an embodiment of an IP packet generation according to the present invention.

In the IP packet generation procedure shown in FIG. 4, in a first step S401 an IP header of a packet to be transmitted is formed. In step S402, an extension header of the packet is formed which comprises fields SPI, SN and SDU. In step S403 it is decided whether signaling data for an intermediate node should be added to the SDU. If Yes in step S403, a corresponding indication and signaling data are added to the SDU in step S404. If No in step S403, only an indication is added to the SDU in step S405 that no signaling data is present in the SDU.

Then, in step S406 following step S405 or S404, it is determined whether there are fields to be encrypted in the payload data. If No in step S406, a corresponding indication is added to the SDU in step S407. In step S408 the payload data are added to the IP packet after the extension header in clear text. In contrast thereto, if it is determined in step S406 that there are fields to be encrypted, in step S409 the fields to be encrypted are concatenated and encryption is performed. In step S410 the encrypted fields are made to replace the corresponding fields in the original message, i.e. the payload data in clear text, and the payload data is formed. In step S411, PDFs corresponding to the formed payload data are added to the extension header according to the first or second embodiment. Moreover, in step S411 an indication that at least one PDF is present is added to the SDU. In step S412, following step S411 or S408, a check value is added at the end of the IP packet.

According to the invention, information in clear text is added to a data packet transmitted from a sender to a receiver with end-to-end security in an IP network, which information indicate encrypted data fields in payload data of the packet and/or instruct an intermediate node located on a path between the sender and the receiver how to process the packet.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method of generating data packets to be transmitted with end-to-end security between a sender and a receiver in an IP network system, the method comprising:
   providing information for an intermediate node located on a path between a sender and a receiver in a part of a packet in clear text, the information supporting the intermediate node in processing the packet, wherein the part of the packet in which the information is provided is different from payload data;
   selecting fields of the payload data in clear text, wherein the fields are to be encrypted;
   concatenating the fields to be encrypted;
   encrypting concatenated fields;
   splitting up an encryption result according to a length of the fields; and
   replacing encrypted fields in the payload data in clear text, wherein the fields of the payload data in encrypted form are indicated in the information based on the payload data including replaced encrypted fields.

2. The method according to claim 1, further comprising:
   indicating in the information how the packet is to be processed by the intermediate node.

3. The method according to claim 2, further comprising:
   receiving the packet at the receiver;
   detecting in the information which fields of the payload data are in encrypted form; and
   decrypting detected encrypted payload fields.

4. The method according to claim 1, further comprising:
   indicating in the information whether the payload data of the packet comprises encrypted fields.

5. The method according to claim 4, further comprising:
   indicating in the information which fields of the payload data are in encrypted form.

6. The method according to claim 1, further comprising:
   receiving the packet at the intermediate node;
   detecting the information for the intermediate node; and
   processing the packet based on a detection result.

7. A method of generating data packets to be transmitted with end-to-end security between a sender and a receiver in an IP network system, the method comprising:
   providing information in a part of a packet in clear text, the information indicating encrypted fields in payload data of the packet, wherein the part of the packet in which the information is provided is different from the payload data;
   selecting fields of the payload data in clear text, the fields are to be encrypted;
   concatenating the fields to be encrypted;
   encrypting concatenated fields;
   splitting up an encryption result according to a length of the fields;
   replacing encrypted fields in the payload data in clear text; and
   indicating the fields of the payload data in encrypted form in the information based on the payload data including replaced encrypted fields.

8. The method according to claim 7, further comprising:
   indicating in the information how the packet is to be processed by an intermediate node located on a path between a sender and a receiver.

9. The method according to claim 7, further comprising:
   receiving the packet at the intermediate node;
   detecting the information; and
   processing the packet based on a detection result.

10. The method according to claim 7, further comprising:
    receiving the packet at a receiver;
    detecting in the information which fields of the payload data are in encrypted form; and
    decrypting detected encrypted payload fields.

11. A signal comprising data packets to be transmitted with end-to-end security between a sender and a receiver in an IP network system, wherein at least one packet comprises information for an intermediate node located on a path between the sender and the receiver in a part of a packet in clear text, wherein the information supports the intermediate node in processing the at least one packet, and wherein the information further includes:
    an indication of encrypted fields in payload data of the at least one packet; and
    an indication of the fields of the payload data in encrypted form including replaced encrypted fields.

12. A sender for generating a data packet to be transmitted with end-to-end security between the sender and a receiver in an IP network system, the sender is configured to:
    provide information for an intermediate node, the intermediate being located on a path between a sender and a receiver, in a part of the packet in clear text, the information supporting the intermediate node in processing the packet;
    select fields of the payload data in clear text, the fields are to be encrypted;
    concatenate the fields to be encrypted;
    encrypt concatenated fields;
    split up an encryption result according to a length of the fields;
    replace encrypted fields in the payload data in clear text; and
    indicate the fields of the payload data in encrypted form in the information based on the payload data including replaced encrypted fields.

13. An intermediate node located on a path between a sender and a receiver in an IP network system for processing data packets transmitted between the sender and the receiver with end-to-end security, the intermediate node is configured to:
    receive a data packet transmitted from a sender to a receiver with end-to-end security;
    detect information provided in a part of a received packet in clear text; and
    process the packet based on a detection result,
    wherein the information comprises an indication of encrypted fields in payload data of the received packet, and an indication of the fields of the payload data in encrypted form comprising replaced encrypted fields.

14. A receiver for receiving a data packet transmitted between a sender and the receiver with end-to-end security in an IP network system, the receiver is configured to:
    detect based on information provided in a part of a received packet, which fields of payload data of the received packet are in encrypted form; and
    decrypt detected encrypted payload fields,
    wherein the information comprises an indication of encrypted fields in payload data of the received packet, and an indication of the fields of the payload data in encrypted form comprising replaced encrypted fields.

15. A method of processing data packets transmitted between a sender and a receiver with end-to-end security, in an intermediate node located on a path between the sender and the receiver in an IP network system, the method comprising:
- receiving a data packet transmitted from a sender to a receiver with end-to-end security;
- detecting information provided in a part of a received packet in clear text; and
- processing the packet based on a detection result,
- wherein the information comprises an indication of encrypted fields in payload data of the received packet, and an indication of the fields of the payload data in encrypted form comprising replaced encrypted fields.

16. A method of receiving data packets transmitted between a sender and a receiver with end-to-end security in an IP network system, the method comprising:
- detecting based on information provided in a part of a received packet, which fields of payload data of the received packet are in encrypted form; and
- decrypting the detected encrypted payload fields,
- wherein the information comprises an indication of encrypted fields in payload data of the received packet, and an indication of the fields of the payload data in encrypted form comprising replaced encrypted fields.

17. A computer program embodied on a computer readable medium executed by a processor for sending a packet to an intermediate node located on a path between a sender and a receiver, the program is configured to perform:
- providing information for the intermediate node in a part of the packet in clear text, the information supporting the intermediate node in processing the packet, wherein the part of the packet in which the information is provided is different from payload data;
- selecting fields of the payload data in clear text, wherein the fields are to be encrypted;
- concatenating the fields to be encrypted;
- encrypting concatenated fields;
- splitting up an encryption result according to a length of the fields; and
- replacing encrypted fields in the payload data in clear text,
- wherein the fields of the payload data in encrypted form are indicated in the information based on the payload data including replaced encrypted fields.

18. A sender for generating a data packet to be transmitted with end-to-end security between the sender and a receiver in an IP network system, the sender comprising:
- providing means for providing information for an intermediate node, the intermediate node being located on a path between a sender means and a receiver means, in a part of the packet in clear text, the information supporting the intermediate node in processing the packet;
- selecting means for selecting fields of the payload data in clear text, the fields are to be encrypted;
- concatenating means for concatenating the fields to be encrypted;
- encrypting means for encrypting concatenated fields;
- splitting means for splitting up an encryption result according to a length of the fields;
- replacing means for replacing encrypted fields in the payload data in clear text; and
- indicating means for indicating the fields of the payload data in encrypted form in the information based on the payload data including replaced encrypted fields.

* * * * *